UNITED STATES PATENT OFFICE.

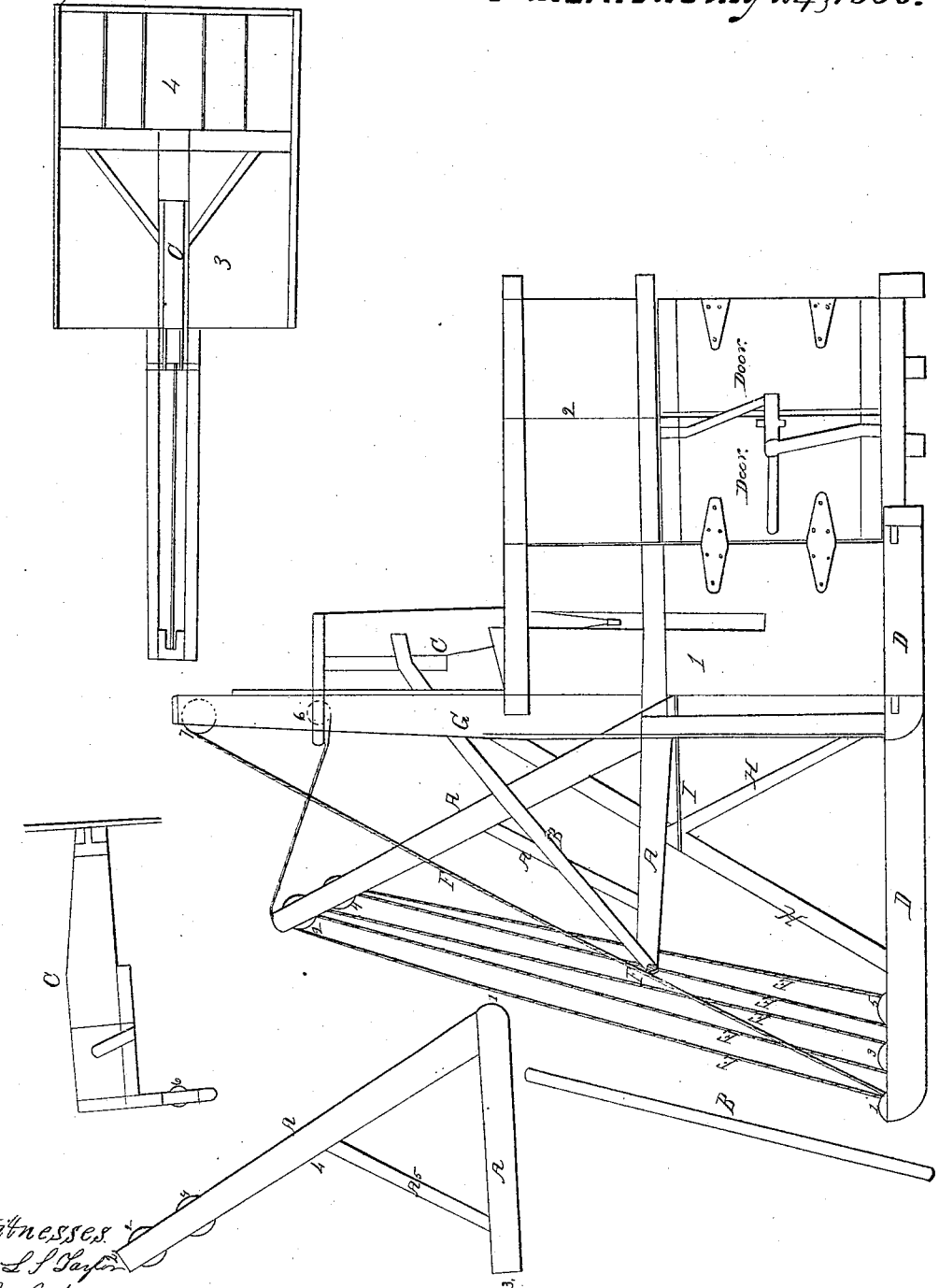
S. Stevens,
Hay Press.
N° 29,320. Patented July 24, 1860.

SYLVESTER STEVENS, OF SACRAMENTO, CALIFORNIA.

IMPROVED HAY-PRESS.

Specification forming part of Letters Patent No. 29,320, dated July 24, 1860.

*To all whom it may concern:*

Be it known that I, SYLVESTER STEVENS, of the city and county of Sacramento, and State of California, have invented a new and useful Machine for Pressing Hay, Cotton, and Hemp into Bales for Commercial Purposes; and I do hereby declare that the following is a full, clear, and exact description of the construction and operation of the same, reference being had to the annexed drawings, making a part of this specification, in which—

Figure 1 is a side view of the whole machine. Fig. 2 is a front view showing the doors and fastenings where the bale is removed after being pressed and bound. Figs. 3 and 4 is a front view with the doors and boarding removed, showing the follower 3, and the bale pressed and bound, Fig. 4.

The letter A represents the lever, five by six inches and eight feet long, from 1 to 2. The return, five by six inches, and from 1 to 3, is four feet long. 5 is a brace. This forms a triangle. B is two iron bars seven feet long, one-half inch by two inches, and connects the lever A with the follower C. First, I construct a strong box, six feet high and two feet six inches by four feet four inches. I use one-and-one-half inch boards. I place this box on four sills—two short ones and two twelve feet long—D. In the rear of the box I place two uprights twelve feet long, three by eight inches at the base, and three by six inches at the top. In the end of the sills D, I place three pulleys, and in the end of the lever I place two pulleys. I put an inch rope, E, over these pulleys in the order in which they are numbered. This rope is used to depress the lever, which causes the follower C to descend into the cavity of the box, and as the lever descends the bars B approach the fulcrum, increasing the power of the lever as power is required, and in an incalculable ratio. The rope F is used to elevate the lever and follower. The lever passes up to a perpendicular position between the uprights. This rope F passes over the pulleys numbered 1, 6, and 7, and is securely fastened to the outer end of the lever. One-horse power attached to the rope at pulley No. 1, is sufficient to work the machine.

What I claim as my invention is—

The entire machine, together with the combination and application of the lever and pulleys, as set forth in this specification and the annexed drawings, for the purposes of pressing hay, cotton, and hemp, to be known as "Stevens' compound pulley and lever press."

SYLVESTER STEVENS.

Witnesses:
L. S. TAYLOR,
W. H. MCBURNEY,
A. CRUM.